US007011003B1

(12) United States Patent
Berke

(10) Patent No.: US 7,011,003 B1
(45) Date of Patent: Mar. 14, 2006

(54) FORK WITH TINE PROTECTOR GUARD AND METHOD

(76) Inventor: Joseph J. Berke, 3248 Interlaken, West Bloomfield, MI (US) 48323

( * ) Notice: Subject to any disclaimer, the term of this patent is extended or adjusted under 35 U.S.C. 154(b) by 0 days.

(21) Appl. No.: 10/716,677

(22) Filed: Nov. 20, 2003

(51) Int. Cl.
*A47J 43/28* (2006.01)

(52) U.S. Cl. .......................... 83/13; 83/698.21; 30/143; 30/147; 30/162; 30/295; 30/323

(58) Field of Classification Search ............... 30/323, 30/143, 147, 286, 295, 162, 322; 83/13, 83/698.21
See application file for complete search history.

(56) References Cited

U.S. PATENT DOCUMENTS

| 1,814,547 A | * | 7/1931 | Edwards | 30/143 |
| 2,109,016 A | * | 2/1938 | Ringer | 30/143 |
| 2,348,429 A | * | 5/1944 | Walker | 30/90.7 |
| 2,456,858 A | * | 12/1948 | Bolling | 30/143 |
| 2,882,598 A | * | 4/1959 | Fidelman | 30/294 |
| 4,893,408 A | * | 1/1990 | Mattingly et al. | 30/123.5 |
| 5,117,558 A | * | 6/1992 | Hull | 30/323 |
| 5,699,614 A | * | 12/1997 | Garneau, Sr. | 30/142 |
| 5,749,286 A | * | 5/1998 | Payette | 99/413 |
| 5,890,223 A | * | 4/1999 | Klemmer | 30/150 |
| 6,055,733 A | * | 5/2000 | Chen | 30/142 |
| 2004/0006876 A1 | * | 1/2004 | Popeil et al. | 30/323 |

* cited by examiner

Primary Examiner—Charles Goodman
(74) Attorney, Agent, or Firm—Alex Rhodes

(57) ABSTRACT

A large kitchen or barbecue fork and protector for preventing injuries from sharp tines of the fork and preventing food contamination from bacteria and dirt on the tines. The guard is movable on a shank of the fork from a covering relationship with the sharp pointed tines to an uncovering relationship with the sharp pointed tines. The guard is comprised of a hub portion which closely fits the shank and a cover portion which encloses the tines in the covering portion. In a first embodiment, the guard is retained on the shank at the covering and uncovered positions by a permanent magnet mounted in the guard. In a second embodiment, the guard is retained on the shank at the covering and uncovered positions by the friction of the guard on the shank.

8 Claims, 5 Drawing Sheets

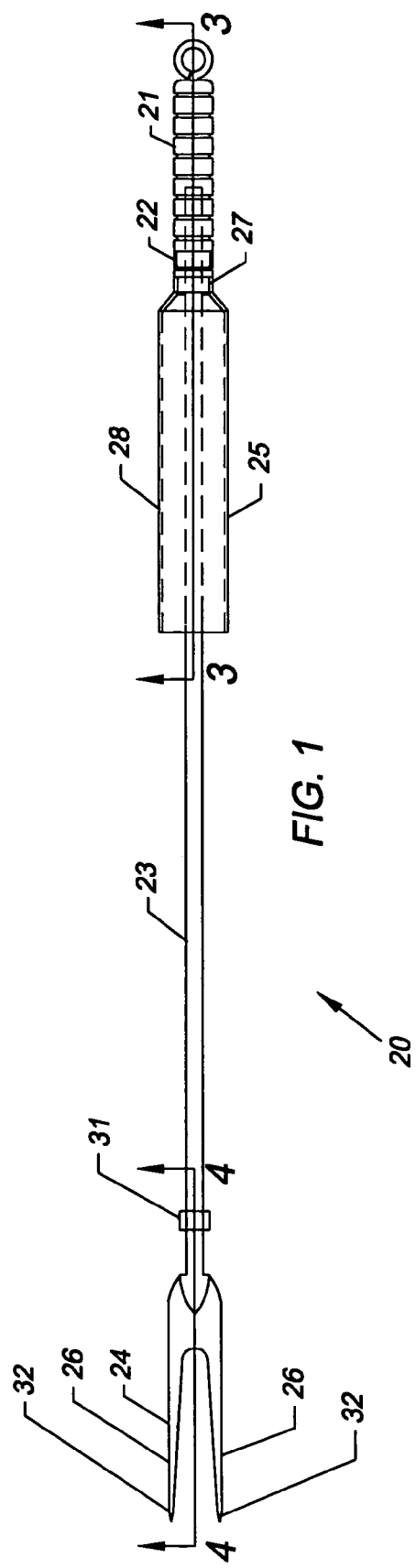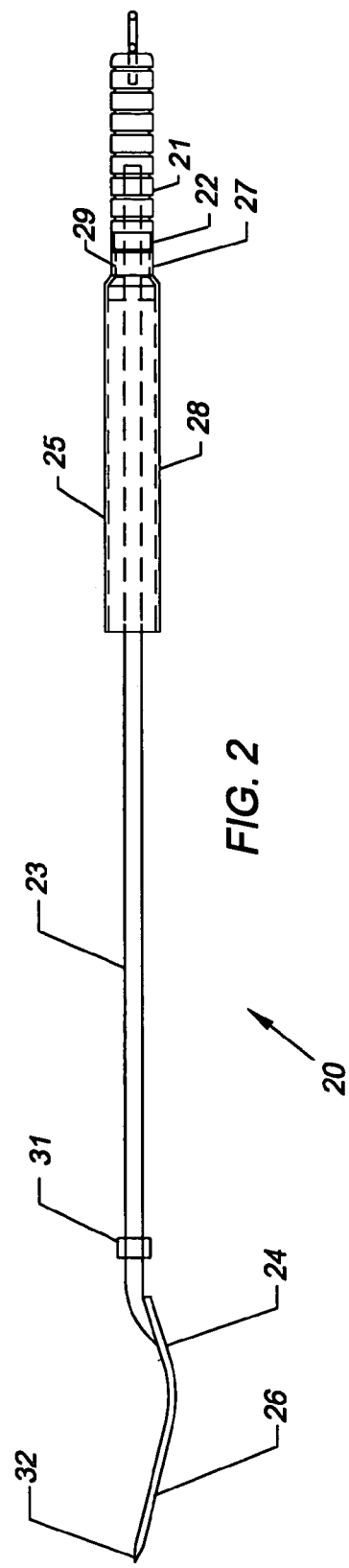

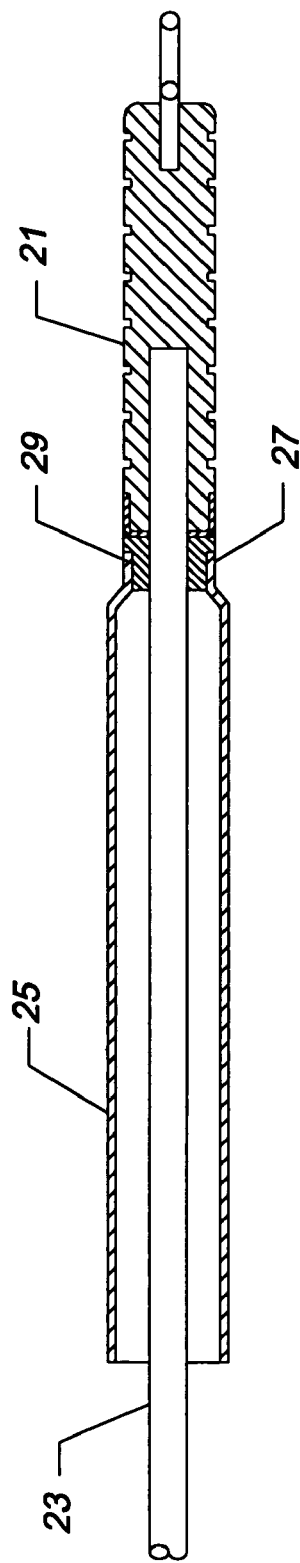
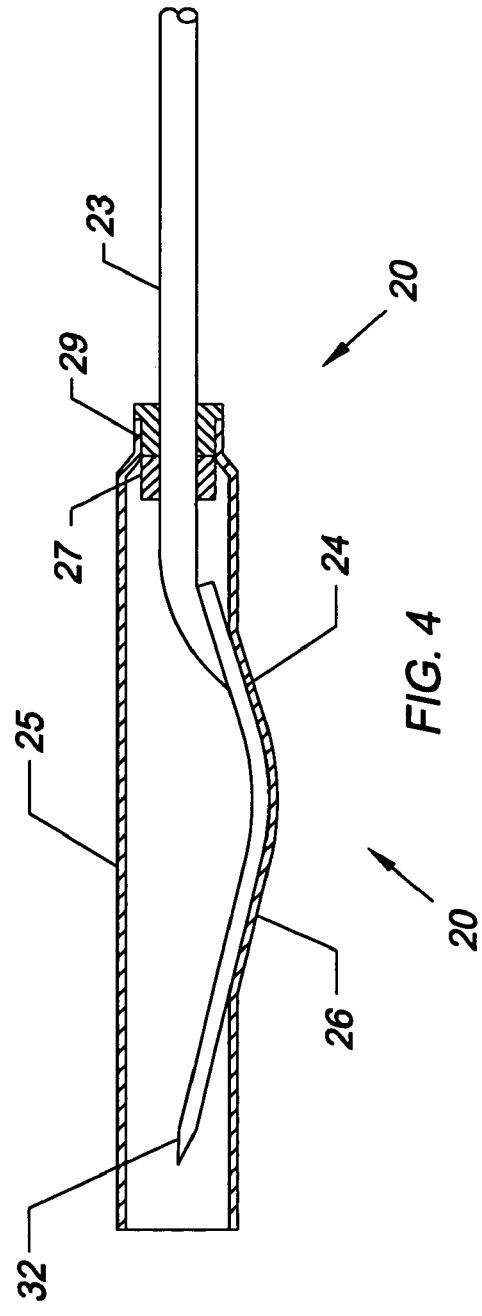

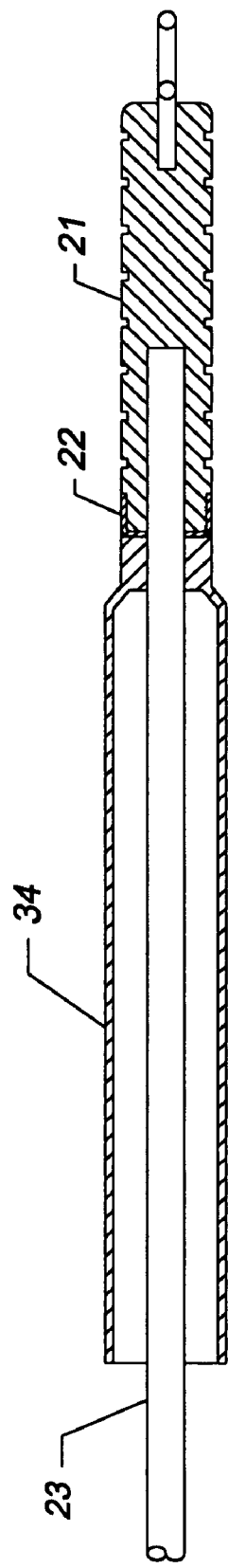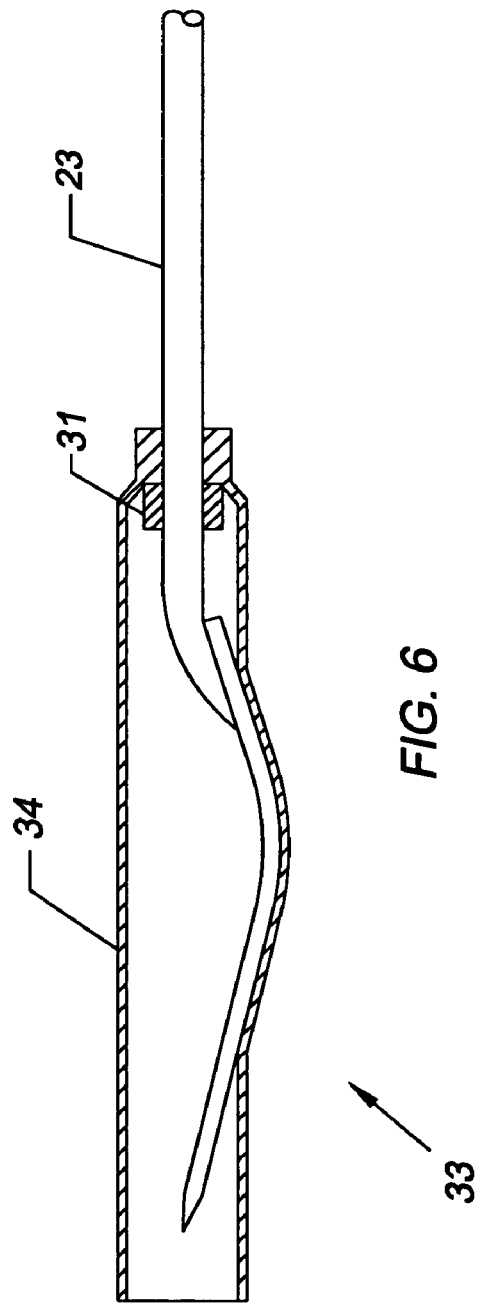
FIG. 5
FIG. 6

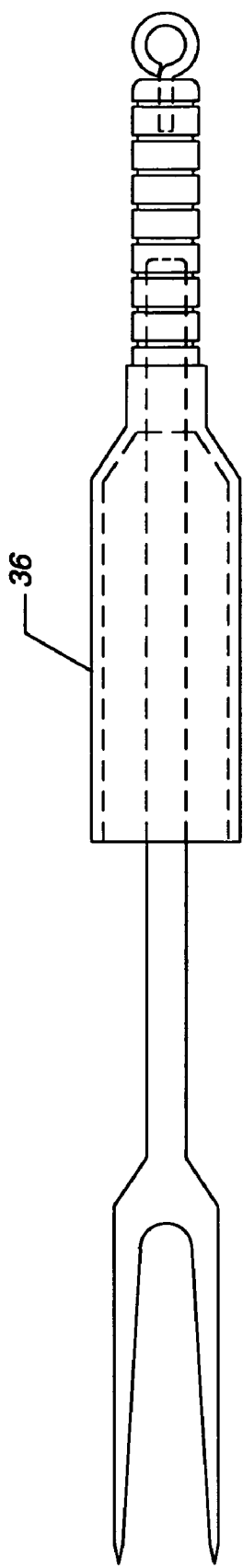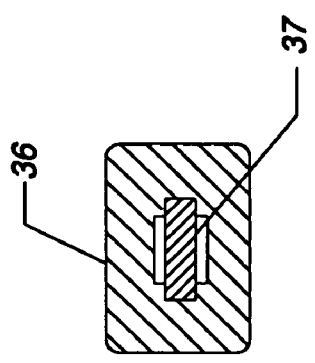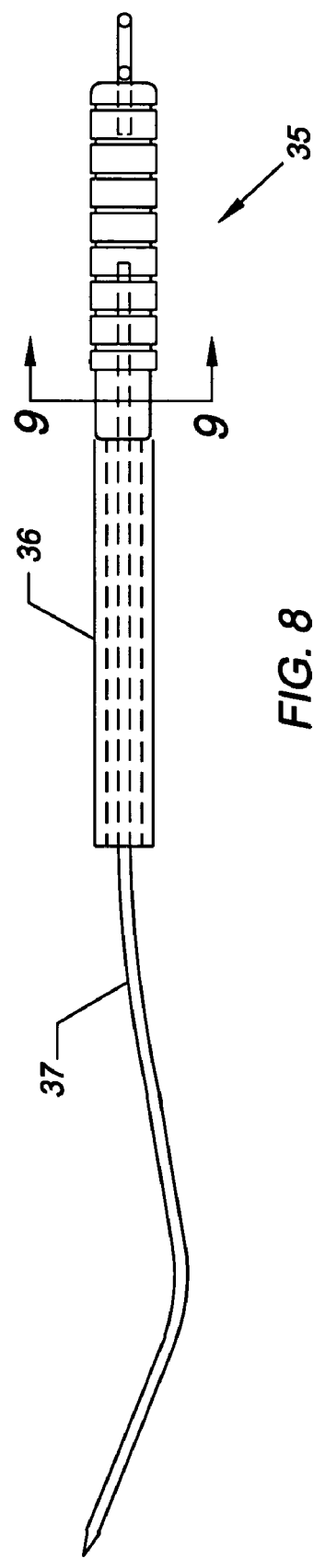
FIG. 7
FIG. 9
FIG. 8

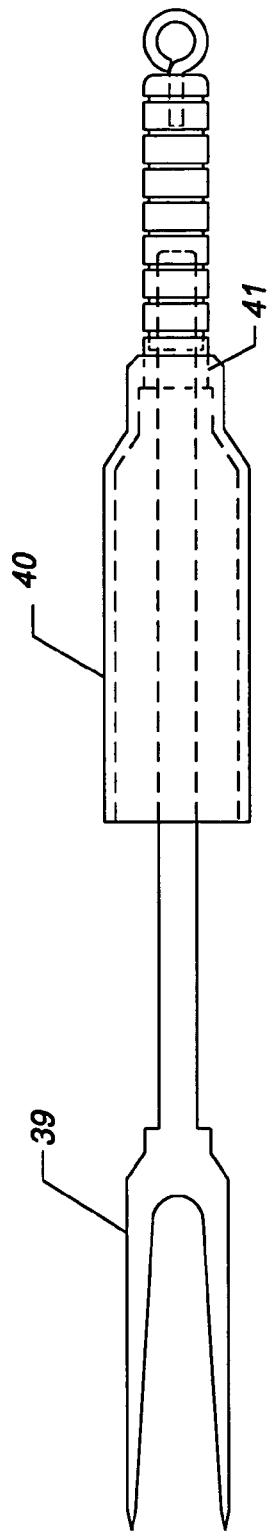
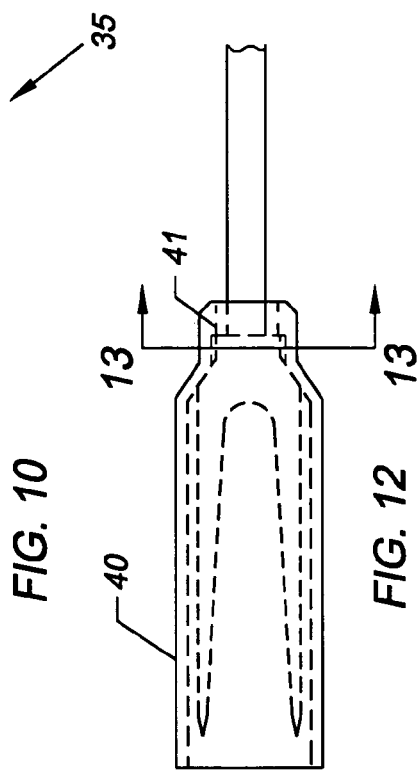
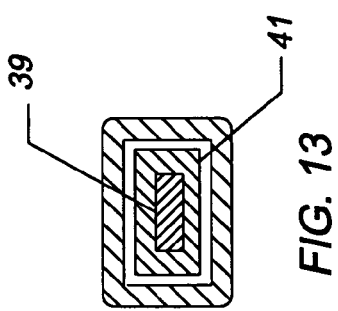
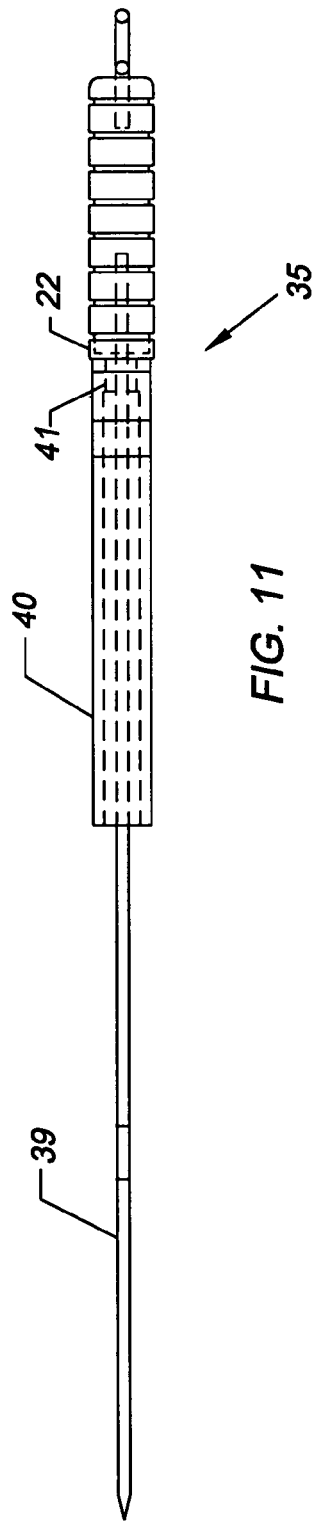

FORK WITH TINE PROTECTOR GUARD AND METHOD

FIELD OF THE INVENTION

This invention relates to cooking utensils and more particularly to a large kitchen and barbecue fork for manipulating, lifting and turning food and as an adjunct in slicing meats, etc. and a guard for preventing injuries from sharp tines and preventing food contamination from the tines.

BACKGROUND OF THE INVENTION

Large kitchen and barbecue forks are well known in the art. They are used for manipulating, lifting and turning food and as an adjunct in slicing and cutting meats. They generally consist of a pair of sharp pointed tines, a handle and an intervening shank. While large forks fulfill their common objectives and requirements, they suffer from a number of disadvantages such as injuries from their sharp pointed tines and contamination from dirt and bacteria. With these shortcomings in mind, it is obvious that a need exists to prevent injury and to prevent contamination of large kitchen and barbecue forks.

SUMMARY OF THE INVENTION

The present invention satisfies the heretofore described need. The invention resides in a movable guard which is slidably mounted on the shank of a large kitchen or barbecue fork. The guard is movable from a covering relationship with sharp pointed tines to an uncovering relationship with the sharp pointed tines and is retained in either position. In a first embodiment, the guard is magnetically retained at the covering and uncovered positions. In a second embodiment, the guard is retained by friction.

Other objects and further scope of applicability of the present invention will become apparent from the detailed description given hereafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be better understood and further objects, characterizing features, details and advantages thereof will appear more clearly with reference to the diagrammatic drawings illustrating a preferred embodiment of the invention by way of non-limiting example only.

FIG. 1 is a plan view of a large culinary fork and a guard in a tine uncovering position.

FIG. 2 is a side view of the fork and guard.

FIG. 3 is an enlarged fragmentary cross-sectional view taken on the line 3—3 in FIG. 1.

FIG. 4 is an enlarged fragmentary cross-sectional view taken on the line 44 in FIG. 1 showing the guard in a tine covering position.

FIG. 5 is an enlarged cross-sectional view of an alternate embodiment taken in the same manner as FIG. 3.

FIG. 6 is an enlarged cross-sectional view of the alternate embodiment taken in the same manner as FIG. 4.

FIG. 7 is a plan view of a second alternate embodiment showing the guard in a tine uncovering position.

FIG. 8 is a side view of the second alternate embodiment.

FIG. 9 is an enlarged cross-sectional view taken on the line 9—9 in FIG. 8.

FIG. 10 is a plan view of a third alternate embodiment showing the guard in a tine uncovering position.

FIG. 11 is a side view of the second alternate embodiment.

FIG. 12 is a fragmentary view showing the guard in a tine covering position.

FIG. 13 is an enlarged cross-sectional view taken on the line 13—13 in FIG. 12.

DESCRIPTION OF THE PREFERRED EMBODIMENTS

Referring now in detail to the drawings for the purpose of illustrating preferred embodiments of the present invention, the culinary fork and guard 20 as shown in FIGS. 1 through 4, cylindrical steel shank 23, attached at one end portion thereof to the handle 21; a forked end portion 24 attached to an opposite end portion of the shank 23, and a guard 25. The forked end portion 24 which is resistance welded to the shank 23 consists of an end portion having a pair of sharp pointed tines 26. The handle 21 and the attachment of the handle 21 to the end portion of the shank 23 are conventional. The guard 25 is slidably mounted on the shank 23 and is moveable from an uncovering relationship with the sharp pointed tines 26 as shown in FIG. 3 to a covering relationship with the sharp tines 26 as shown in FIG. 4.

The guard 25 is comprised of a hub portion 27 which closely fits on the shank 23, an adjoining cover portion 28 and a permanent magnet 29 which is retained in the hub portion 27. The guard 25 is preferably made of a flexible polymer, woven ceramic cloth or a silica cloth and is coated with a non-stick fire resistant material, such as a TEFLON®. As later will be shown, in certain cases the guard may be made of a rigid ceramic material.

The permanent magnet 29, which is conventional, is a cylindrical sintered magnet 29. With reference to FIG. 4, at the end portion of the handle is the stamped steel trim collar 22 which is attracted by the magnet 29 to hold and retain the guard 25 in the tine uncovering position. With reference to FIG. 4, at the end portion of the shank 23 which is adjacent to the forked end portion 24 is a split steel collar 31. The collar 31 may optionally be formed by conventional cold upsetting the slender cylindrical steel shank 23. In the covering position, the tines 26 and their sharp end portions 32 are totally enclosed by the guard 26, thus preventing injuries from and the contamination of the food handling tines 26.

Referring now to FIGS. 5 and 6, an embodiment 33 is shown wherein the guard 34 is made of a flexible material having a matrix of magnetic iron particles, thus eliminating the permanent magnet 29 of the preceding embodiment 20. In FIGS. 7 through 9 inclusive, a second 35 embodiment is shown wherein the guard 36 is retained in the covering and uncovering positions by the friction of the guard 36 with the shank 23 of the fork 39.

In FIGS. 10 through 13, an embodiment 38 is shown comprised of a straight fork 39, a rigid ceramic guard 40 and a permanent magnet 41 which is pressed or cemented to the guard 40.

Although only several embodiments have been described it is obvious that other embodiments can be derived by such obvious changes as inversion of elements, substitution of elements and changes in material, shape and composition without departing from the spirit thereof. By way of example, a pair of magnets, one at the tine end of a fork, the other at the handle end of the fork, and a ferro-magnetic insert in the tine protector could be used to retain the protector in the covering and uncovering positions. Such variations are not to be regarded as a departure from the spirit and scope of the invention, and all such modifications as would be obvious to one skilled in the art are intended to be included in the scope of the following claims.

What I claim is new is:

1. A method for preventing injury and food contamination from sharp pointed tines of a large kitchen or barbecue fork comprising the steps of mounting a thin wall cylindrical guard on a slender elongated shank of said fork; sliding said guard on said shank to a position of covering relationship with said sharp pointed tines of said barbecue fork when said fork is not in use; magnetically retaining said guard in said position of covering relationship when said fork is not in use; sliding said guard to a position of uncovering relationship with said sharp pointed tines of said barbecue fork when said fork is in use; and magnetically retaining said guard in said position of uncovering relationship when said fork is in use.

2. In combination, a large kitchen or barbecue fork and a guard for manipulating, lifting and turning food and as an adjunct in slicing meats, said combination comprising: a handle, a slender elongated shank attached at one end portion thereof to said handle, a forked end portion attached to an opposite end portion of said shank, said forked end portion having at least one pair of sharp pointed tines; and a guard, said guard having a cover portion for preventing injuries and contamination when said barbecue fork is not in use by covering said sharp pointed tines; and a means for selectively retaining said guard in covering relationship to said sharp pointed tines when said barbecue fork is not in use and in uncovering relationship to said sharp pointed tines when said barbecue fork is used for manipulating, lifting and turning food or slicing meats, said means comprising: a steel collar adjacent to said forked end portion; a steel collar attached to an end portion of said handle; and a magnet in an end portion of said guard for cooperating with said steel collar on said shank to retain said guard in covering relationship to said sharp pointed tines and for cooperating with said steel collar on said handle to retain said guard in uncovering relationship to said sharp pointed tines.

3. The combination recited in claim 2 wherein said guard is made of a flexible material.

4. The combination recited in claim 2 wherein said guard is coated with a non-stick fire resistant material.

5. The combination recited in claim 2 wherein said guard is made of a woven ceramic material.

6. The combination recited in claim 2 wherein said guard is made of a silica cloth.

7. The combination recited in claim 2 wherein said guard is made of a rigid ceramic material.

8. In combination, a large kitchen or barbecue fork for manipulating, lifting and turning food and as an adjunct in slicing meats and a generally cylindrical elongated guard, said fork comprising: a handle, an elongated steel shank attached at one end portion thereof to said handle, a forked end portion attached to an opposite end portion of said shank, said forked end portion having at least one pair of sharp pointed tines; a steel collar on said shank adjacent to said forked end portion; a steel collar attached to an end portion of said handle; said guard having a cover portion for preventing injuries and contamination by covering said sharp pointed tines of said fork and an adjoining hub portion; and a magnet in an end portion of said guard for cooperating with said steel collar on said shank to retain said guard in covering relationship to said sharp pointed tines when said fork is in use and for cooperating with said steel collar on said handle to retain said guard in uncovering relationship to said sharp pointed tines when said fork is not in use.

\* \* \* \* \*